United States Patent [19]

Archibald

[11] Patent Number: 5,564,792
[45] Date of Patent: Oct. 15, 1996

[54] BALANCING WEIGHT ATTACHMENT SYSTEM FOR A VEHICLE WHEEL

[75] Inventor: Kenneth R. Archibald, Canton, Mich.

[73] Assignee: Hayes Wheels International, Inc., Romulus, Mich.

[21] Appl. No.: 512,500

[22] Filed: Aug. 8, 1995

Related U.S. Application Data

[63] Continuation-in-part of Ser. No. 355,363, Dec. 13, 1994, abandoned.

[51] Int. Cl.⁶ ............................................. B60B 21/10
[52] U.S. Cl. ........................ 301/5.21; 301/63.1; 301/65
[58] Field of Search ........................... 301/5.21, 5.22, 301/63.1, 65

[56] References Cited

U.S. PATENT DOCUMENTS

| | | | |
|---|---|---|---|
| 121,411 | 11/1871 | Phelps | 301/5.21 X |
| 3,799,618 | 3/1974 | Martinoli | 301/5.21 |
| 5,271,663 | 12/1993 | Maldini et al. | 301/5.22 |
| 5,350,220 | 9/1994 | Atwell, Jr. | 301/5.21 |
| 5,429,422 | 7/1995 | Baldi | 301/5.21 |

*Primary Examiner*—Russell D. Stormer
*Attorney, Agent, or Firm*—MacMillan, Sobanski & Todd

[57] ABSTRACT

An improved system for attaching balance weights to a wheel utilizes a balancing flange which extends radially inwardly from a wheel rim for mounting the balance weights. The system is particularly suited for use with full face wheels of the type wherein a full face cast or forged disk is joined to a partial wheel rim. The balancing flange may be suitably formed on the outboard portion of the partial wheel rim, and then butted against and welded to an axially extending annular flange formed on the inboard surface of the wheel disk. Balance weights may then be clipped to the flange at specified locations to balance the wheel and a tire mounted thereon. As the balance weights will not be visible from the outboard surface of the wheel, the cosmetic appearance of the wheel is not impaired. Preferably, the balancing flange is positioned in or near the plane of rotation of the center of mass of the wheel and tire assembly such that the balance weights do not create a force couple acting on the wheel.

20 Claims, 3 Drawing Sheets

BALANCING WEIGHT ATTACHMENT SYSTEM FOR A VEHICLE WHEEL

CROSS REFERENCE TO RELATED APPLICATION

This application is a continuation-in-part of pending application Ser. No. 08/355,363 filed on Dec. 13, 1994 now abandoned, and assigned to the assignee of this application.

BACKGROUND OF THE INVENTION

This invention relates to a balance weight attachment system for vehicle wheels and is particularly suited for use with wheels of the full face type wherein a disk face is, joined to a partial formed rim.

Such a wheel is the subject of U.S. Pat. No. 5,360,261, which is incorporated herein by reference. FIG. 1 illustrates a wheel of the type disclosed in that patent, with the wheel indicated generally at 10. The wheel 10 includes an axially outboard full face wheel disk 11, and an axially inboard partial wheel rim 12.

The wheel disk 11 includes a centrally disposed pilot opening 13 and a plurality of apertures 14 disposed thereabout. The apertures 14 receive the mounting studs (not illustrated) which extend from the vehicle wheel hub (not illustrated). The wheel disk 11 may include a plurality of spokes 15 or other structures which define a plurality of through openings (not shown). The openings assist in ventilation of the vehicle brake assembly (not shown). However, aesthetic consideration will commonly dictate the particular configuration of the visible outboard portion of the wheel disk 11, and various spoke designs, solid disk designs, basket weave designs, and the like are common.

The wheel disk 11 further includes an annular portion 17 which includes an outboard tire bead retaining flange 18 and an outboard bead seat 19. An axially extending annular flange 20 is formed on inboard side of the annular portion 12. The flange 20 forms an outboard deep well side wall 21 and an outboard portion 22 of a deep well 23. A lightener groove 24 may be formed in the annular portion 17 of the wheel disk 11 to reduce the weight and inertia of the wheel disk 11.

The partial wheel rim 12 includes an inboard tire bead retaining flange 25, an inboard bead seat 26, an inboard deep well side wall 27, and a cylindrical inboard portion 28 of the deep well 23. With the partial wheel rim 12 and the wheel disk 11 held in co-axial alignment, they may be joined together by forming a circumferentially continuous weld 29 between the inboard portion 28 of the deep well 23 and the outboard portion 22 of the deep well 23, thereby forming the wheel 10. The weld 29 may be formed by such processes as gas metal arc welding or electron beam welding.

After a tire 33 is mounted on the wheel 10; a check is made of the balance of the combined tire and wheel assembly, indicated generally at 34. If the assembly 34 is out of balance, premature and abnormal wear of the tire 33 may result. Additionally, such a condition may cause a rough ride for the vehicle (not shown) on which the wheel 10 is mounted. Traditionally, balancing of the assembly 34 is done statically, by placing the assembly 34 onto a balance (not shown), noting the direction of tilting of the assembly 34, and fixing a balance weight 35 onto the wheel 10 as required to bring the assembly 34 back to a level (balanced) condition. A large number of the retail tire outlets in this country, if not a majority of such outlets, use the static balancing method when mounting tires onto wheels. Another method of balancing the assembly 34 which may be used is dynamic balancing, which will be further discussed below.

Various kinds of balance weights 35 may be fixed to the wheel 10 to bring the assembly 34 into balance. For example, the balance weight 35 may be of the type commonly in use, having a body made of lead which is cast onto a steel spring clip 36. The body of the balance weight 35 is fixed to the outboard face of the outboard tire bead retaining flange 18. The spring clip 36 extends about the radially outer edge to the inboard face of the outboard tire bead retaining flange 18 to grip the outboard tire bead retaining flange 18, and hold the body of the balance weight 35 against the outer face of the outboard tire bead retaining flange 18. Another type of balance weight which is known are stick-on balance weights. Stick-on balance weights 38 have an adhesive backing for fastening the balance weights 38 to the radially inner surface of the wheel well 27 or other accessible, axially extending surface, as indicated in phantom line in FIG. 1. However, stick-on balance weights have proved to be unreliable, in that the adhesive frequently fails and allows the balance weights to come loose, unbalancing the tire and wheel assembly 34.

Affixing the balance weight 35 to the outboard tire bead retaining flange 18 brings the tire and wheel assembly 34 into static balance. However, the axial offset from the balance weight 35 to the center of gravity of the tire and wheel assembly 34 can create a force couple which causes the tire and wheel assembly 34 to shake and the tire 33 to wear unevenly when the tire and wheel assembly 34 is rotated in operation. To reduce the force couple created, the total weight to be added will often be divided in half, with a first half of the weight being in the form of balance weights 35 fixed to the outboard tire bead retaining flange 18, and the remainder of the weight in the form of balance weights 37 fixed to the inboard tire bead retaining flange 25.

As indicated above, dynamic balancing is another type of balancing which may be performed on the assembly 34. In dynamic balancing, the assembly 34 is rotated and the force and direction of imbalance is noted. The balance weights 35 and 37 are clipped to the outboard tire bead retaining flange 18 and the inboard tire bead retaining flange 25 at the locations calculated to bring the assembly 34 into dynamic balance. The balance weights 35 and 37 may be of different weight, as calculated to cause the net effect of the balance weights 35 and 37 to result in a minimal unbalancing force couple. While dynamic balancing results in the assembly 34 operating more smoothly, with less vibration or abnormal tire wear, the equipment to perform dynamic balancing is relatively expensive, and thus is not universally used.

Regardless of whether the assembly 34 is balanced statically or dynamically, clipping the balance weights 35 to the outboard tire bead retaining flange 18 or the stick-on balance weights 38 to any portion of the outboard face of the wheel 10 is objectionable for a number of reasons. Surface pitting of the wheel 10 in the area of attachment of such balance weights frequently occurs due to galvanic corrosion between the dissimilar metals of the wheel 10 and such balance weights. Such corrosion is objectionable due to the adverse effect on the aesthetic appearance of the outboard face of the wheel 10. Furthermore, conspicuously attaching such balance weights to the outboard face of the wheel 10 is objectionable, because the mere presence of the conspicuous balancing weights 35 or 38 would also detract from the aesthetic appearance of the wheel 10. Thus it would be desirable to be able to avoid clipping or adhering balance weights onto the outboard face of the wheel 10.

SUMMARY OF THE INVENTION

This invention relates to an improved system for attaching balance weights to a wheel which utilizes a balancing flange that extends radially inwardly from a wheel rim for mounting the balance weights. The system is particularly suited for use with full face wheels of the type wherein a full face cast, forged, or otherwise formed disk is joined to a partial wheel rim. The balancing flange may be suitably formed on the outboard portion of the partial wheel rim, and then butted against and welded to an axially extending annular flange formed on the inboard surface of the wheel disk. Balance weights may then be clipped to the flange at specified locations to balance the wheel and a tire mounted thereon. As the balance weights will not be readily visible from the outboard surface of the wheel, the cosmetic appearance of the wheel is not impaired. Preferably, the balancing flange is positioned in or near the plane of rotation of the center of mass of the wheel and tire assembly such that the balance weights do not create a force couple acting on the wheel.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
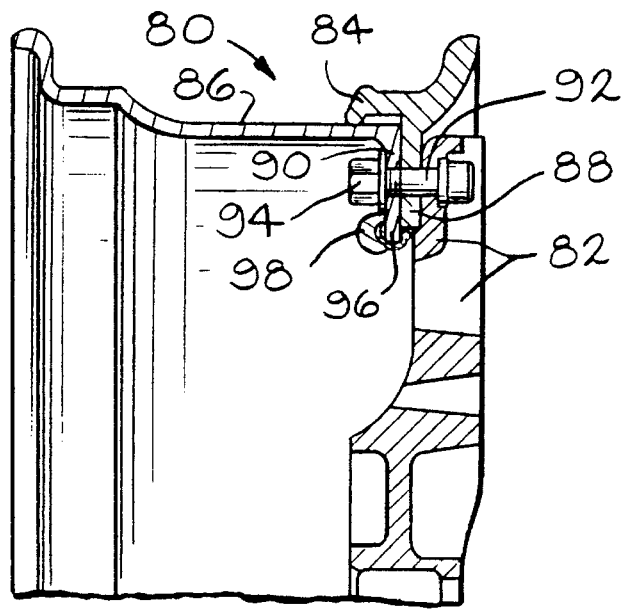
FIG. 4 is a fragmentary sectional view of a three-piece wheel formed by bolting together a wheel disk and an inner and an outer partial wheel rim, and having a weight attachment flange according to a second embodiment of the invention.
Figure 2:
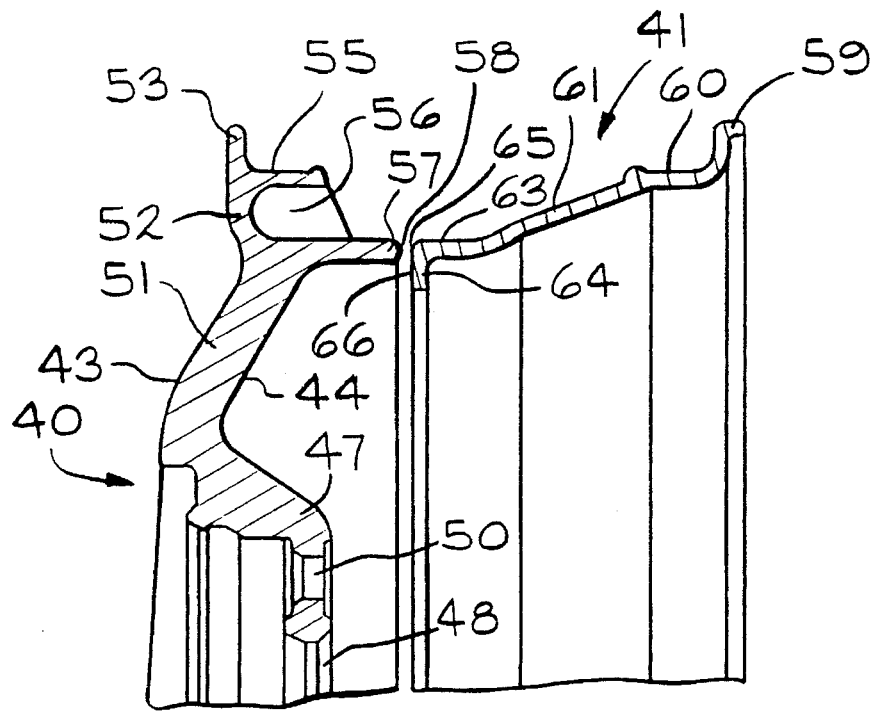
FIG. 2 is a fragmentary sectional view of a wheel disk and a wheel rim according to the invention.
Figure 3:
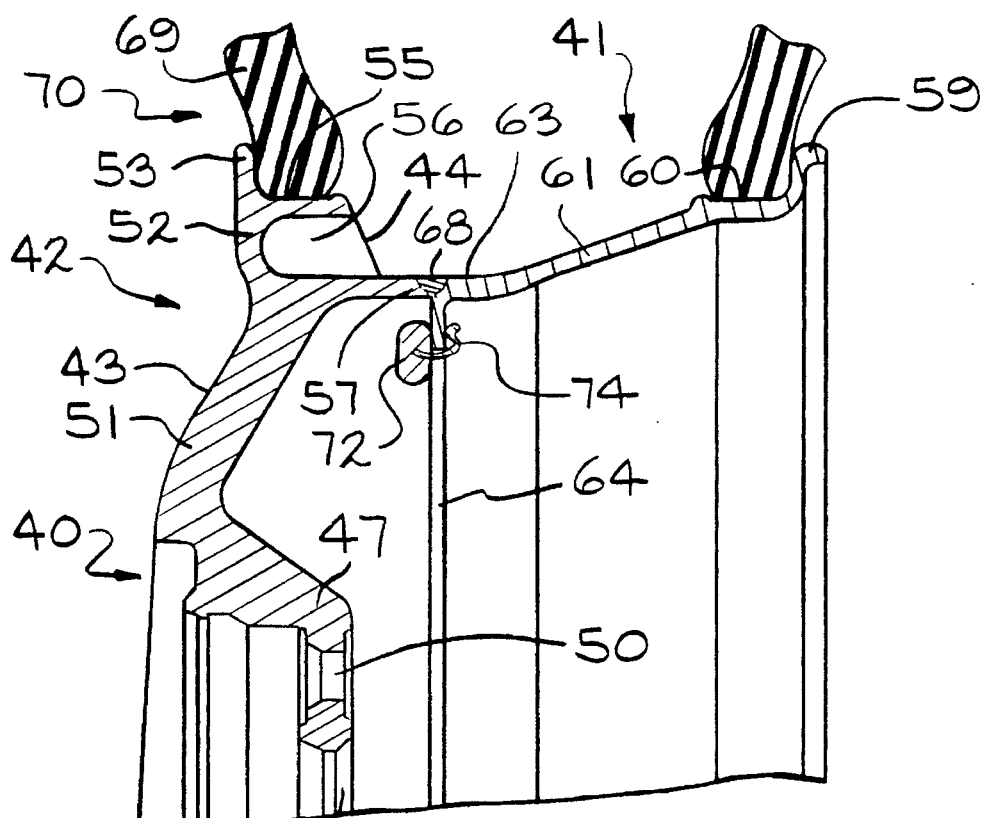
FIG. 3 is a fragmentary sectional view of the wheel formed by welding the wheel disk and the partial wheel rim of FIG. 2 together.

Referring now to the drawings, there is illustrated in FIG. 2 a fragmentary sectional view of a full face wheel disk 40, and an annular partial wheel rim 41. The Wheel disk 40 and the partial wheel rim 41 are joined together to form a full face wheel, indicated generally at 42 in FIG. 3, according to the invention and as will be described below. FIG. 4 illustrates a sequence of steps for producing the wheel 42.

Initially, in step 101, the wheel disk 40 is formed. The wheel disk 40 may be cast or forged from a light weight metal, such as aluminum, titanium or magnesium or an alloy thereof. The wheel disk 40 has an axially outwardly facing outboard face 43 and an inboard face 44 which faces the partial wheel rim 41 in the assembled wheel 42. The wheel disk 40 includes a wheel hub 47 having a central pilot hole 48 and a plurality of wheel lug holes 50 (one shown) formed therethrough. A plurality of spokes 51 (one shown) extend radially from the hub 47 to an annular portion 52. The annular portion 52 includes a radially extending outboard tire bead retaining flange 53. Note that no axially outwardly flaring lip need be formed on the outboard tire bead retaining flange 53, since no balance weights need be attached to the outboard tire bead retaining flange 53, for reasons which will be discussed below. The annular portion 52 also includes an outboard bead seat 55 and a lightener groove 56. An annular flange 57 extends axially from the inboard face 44 of the annular portion 52 of the wheel disk 40. The inboard surface 58 of the annular flange 57 is machined to form a flat surface a predetermined distance from the outboard face 43 of the wheel disk 40.

In the next step 102, the partial wheel rim 41 is formed. The partial wheel rim 41 generally defines a hollow cylinder. The partial wheel rim 41 will normally be formed from the same material as the wheel disk 40, that is, a lightweight metal. The partial wheel rim 41 will preferably be formed by a conventional process, such as rolling or spinning. The partial wheel rim 41 includes an inboard tire bead retaining flange 59, an inboard bead seat 60, and a partial wheel well portion 61 terminating in an annular outboard end portion 63.

The outboard end portion 63 includes a radially inwardly extending balancing flange 64 foraged in step 103. A rolling operation may be used to roll the outboard end portion 63 inwardly to form the balancing flange 64. The rolling operation forms the balancing flange 64 so that the outboard face 66 of the balancing flange 64 is a predetermined distance from the inboard tire bead retaining flange 59. Of course, other forming operations, such as spinning, may be used to form the balancing flange 64.

The step 101 of forming the wheel disk 40 is independent of both the step 102 of forming the partial wheel rim 41 and the step 103 of forming the balancing flange 64. Thus, it is contemplated that wheel disk 40 may be formed before, after, or simultaneously with forming the partial wheel rim 41.

Figure 5:
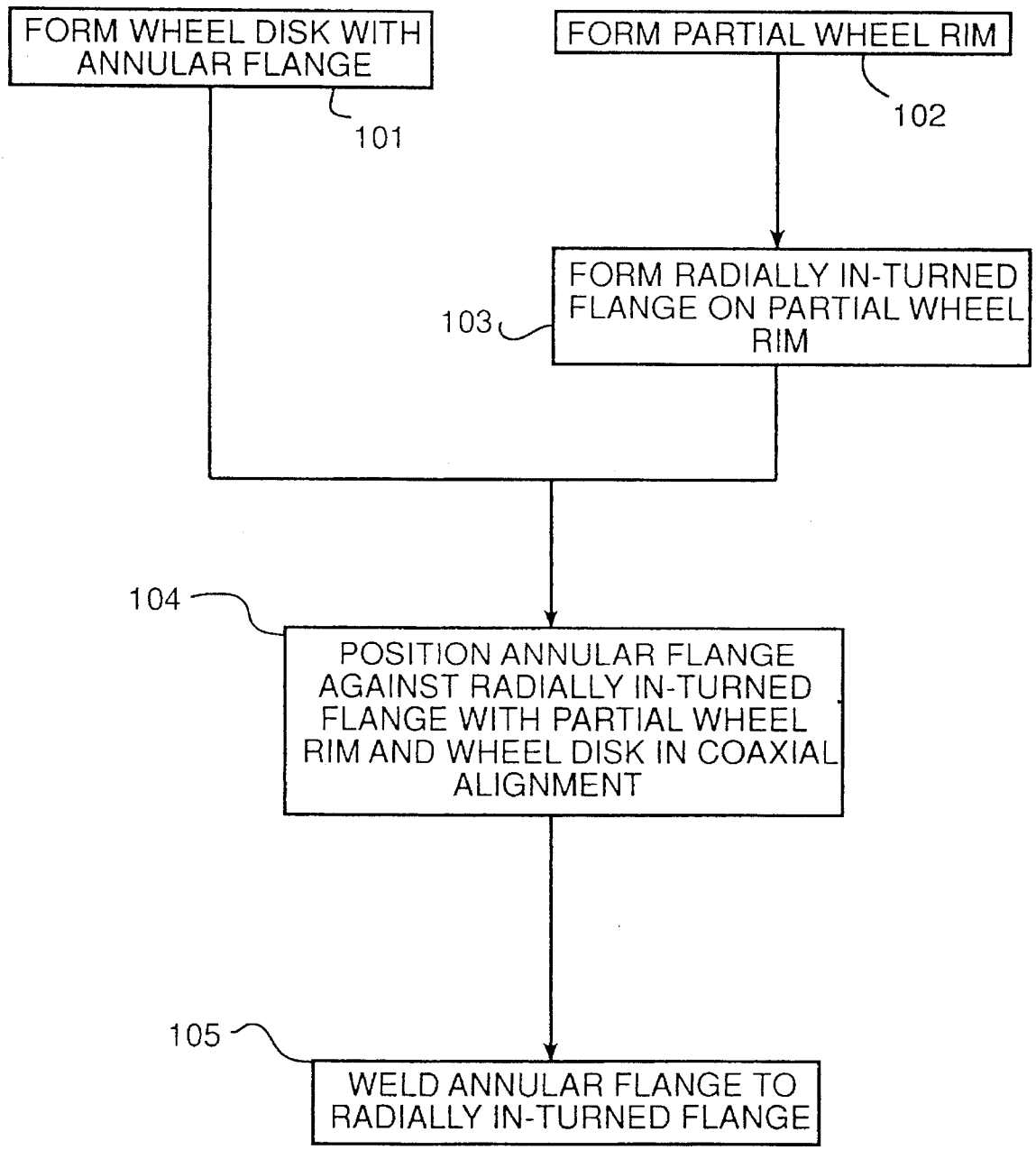
FIG. 5 is a block diagram showing a sequence of steps for producing a wheel constructed in accordance with the present invention.

During assembly of the wheel 42, the partial wheel rim 41 and the wheel disk 40 are held by a fixture (not shown) in co-axial alignment with the outboard face 66 of the balancing flange 64 butted against the inboard surface 58 of the annular flange 57 of the wheel disk 40. This is illustrated as step 104 in FIG. 5. Thus the outboard face 66 of the balancing flange 64 and the inboard surface 58 of the annular flange 57 cooperate to axially position the wheel disk 40 and partial wheel rim 41, setting the width between the inboard tire bead retaining flange 59 and the outboard tire bead retaining flange 53. The relative axial lengths of the annular flange 57 and the outboard end portion 63 are preferably such that the balancing flange 64 is positioned in the expected plane of rotation of the center of mass of the wheel 40 and a tire of the type expected to most commonly be mounted on the wheel 40.

As used in this application, the axial center of mass means that location along the axis of rotation of the wheel and tire assembly where half of the mass of the assembly is inboard thereof, and half of the mass of the assembly is outboard thereof. The plane perpendicular to the axis of rotation of the assembly which passes through the axial center of mass is the plane of rotation of the center of mass.

The partial wheel rim 41 and the wheel disk 40 are welded together in step 105 by forming a circumferentially continuous weld 68 between the outboard end portion 63 and the inboard surface of the annular flange 57 of the wheel disk 40.

Figure 1:
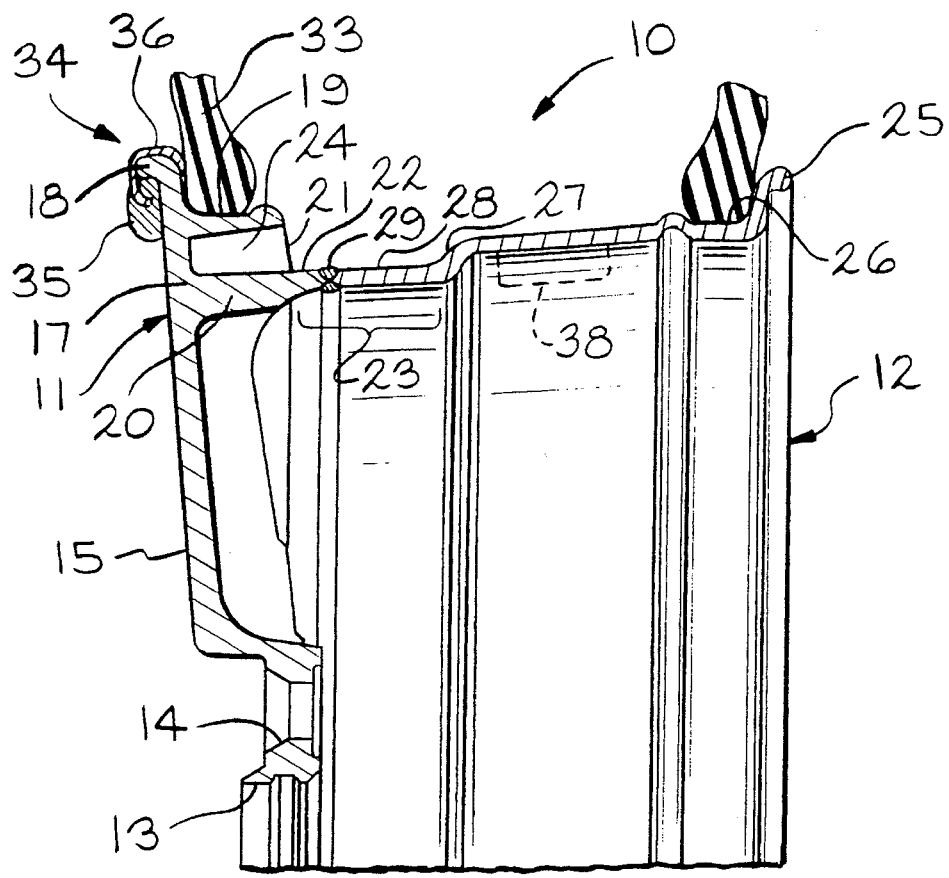
FIG. 1 is a sectional view of a known full face wheel.

After a tire 69 is mounted on the wheel 42, a check is made of the balance of the combined tire and wheel assembly, indicated generally at 70. A balance weight 72, similar to the balance weights 35 and 37 illustrated in FIG. 1 may be used to balance the assembly 71). The balance weight 72 will preferably be of the type having a steel spring clip 74 which grasps the balancing flange 64 tightly to securely fix the balance weight 72 to the wheel 42. However it is contemplated that other known types of balance weights may be fastened to the balancing flange 64, or adjacent to the balancing flange 64. Even if the balance weights used are not fastened to the balancing flange 64, but rather fastened to the radially inner surface of the wheel 42 (for example, if an adhesively attached balance weight is used), the balancing flange 64 may be used as a convenient indication of the location of the plane of rotation of the center of mass of the wheel 42.

The balancing flange 64 provides a near ideal structure for mounting the balance weight 72, as the balancing flange 64 is preferably located in or near the plane of rotation of the center of mass of the assembly 70. Thus, any force couple set up in the assembly 70 by mounting the balance weight 72 to the balancing flange 64 is minimized due to the proximity of the balancing flange 64 to the plane of rotation of the center of mass of the assembly 70. The balancing flange 64 may be slightly out of the plane of rotation of the center of mass for the assembly 70 due to variations among individual tires 69 or wheels 42 during manufacture. However, any force couple caused by affixing the balance weight 72 to the balancing flange 64 in such a case will normally be much less than that caused by affixing the balance weights 70 to just the outboard tire bead retaining flange 53 as has been a common practice in the past.

As indicated above, in the preferred embodiment the balancing flange 64 is located in the plane of rotation of the center of mass of the assembly 70. However, it will be appreciated that if the specific design of the wheel 42 or tire 69 results in the balancing flange 64 being significantly out of the plane of rotation of the center of mass of the assembly 70, an additional balance weight (not shown) of appropriate mass may be added to the appropriate location on the inboard tire bead retaining flange 59 to counteract the force couple and bring the assembly 70 into static and dynamic balance.

Note that no weights need be attached to the outboard tire bead retaining flange 53 to balance the assembly 70. Thus the balance weights added to balance the assembly 70 do not detract from the wheel designer's desired cosmetic effect on the outboard face 43 of the wheel 42.

The balancing flange of the invention may be formed in a single piece cast wheel, for example, by casting a wheel with a circumferential mass on the radially inner face of the rim that defines the inboard face and radially inner face of the balancing flange. Material can then be machined away from the mass to define the outboard face of the balancing flange. As another example, the balancing flange of this invention may also be formed by a rolling operation during the formation of a steel partial wheel rim.

The balancing flange 64 to which one or more balance weights 72 are attached is described as being integrally formed so that the balancing flange 64 extends radially inwardly from the wheel well portion 61 of the wheel 42. However, the balancing flange need not be integrally formed on the partial wheel rim 41. A balancing flange may be integrally formed elsewhere on the radially inner surface of a wheel for mounting balance weights.

Furthermore, the balancing flange need not be integrally formed with any other part of the wheel. For example, a ting may be formed separately from a wheel, and then be fixed, for example by to a suitable location on the wheel concentric with the axis of rotation of the wheel. The ring will thus form a radially inwardly extending balancing flange. Such a balancing flange will preferably be located in the plane of rotation of the center of mass of the wheel, or located in the plane of rotation of the center of mass an assembly which includes the wheel and a tire mounted thereon.

While the invention has been described as a wheel formed from a single partial wheel rim and a separately cast or forged wheel disk including an outboard portion of a wheel rim, the balancing flange for attaching balance weights may be formed in a single piece cast wheel, or other type of wheel formed from fabricated, forged or cast components of various materials. For example, FIG. 4 illustrates a three piece wheel 80 having a wheel disk 82, an outboard partial wheel rim 84, and an inboard partial wheel rim 86. The outboard partial wheel rim 84 includes a radially inwardly extending flange 88 formed on the inboard portion thereof. The inboard partial wheel rim 86 includes a radially inwardly extending flange 90 formed on the annular outboard end portion of the rim 86. The wheel disk 82 and each of the radially inwardly extending flanges 88 and 90 is farmed with a plurality of apertures formed therethrough which are spaced apart about the circumference thereof. The respective apertures in the wheel disk 82 and flanges 88 and 90 are axially aligned to receive an associated bolt 92. The bolt 92 cooperates with an associated nut 94 to fasten the wheel disk 82, the outboard partial wheel rim 84 and the inboard partial wheel rim 86 together to form the wheel 80. The outboard partial wheel rim 84 and the inboard partial wheel rim 86 cooperate to form a wheel rim for mounting a tire (not shown) thereon.

The description thus far describes a conventional three piece wheel. However, according to the invention, a portion 96 of the flange 90 of the inboard partial wheel rim 86 extends radially inwardly farther than the flange 88 of the outboard partial wheel rim 84. Balance weights 98 can be attached to the portion 96, which thus constitutes a balancing flange. Although not shown, the portion 96 of the radially inwardly extending flange 90 may be turned toward inboard relative to the rest of the flange 90 to facilitate installation of a particular form of the balance weights 98. Furthermore, the relative axial lengths of the outboard partial wheel rim 84, and the inboard partial wheel rim 86 may be adjusted so that the portion 96 of the flange 90 lies in the plane of rotation of the center of mass of the wheel 80.

In accordance with the provisions of the patent statutes, the principle and mode of operation of the present invention have been explained and illustrated in the preferred embodiment, however, it will be understood that the present invention may be practiced otherwise than as specifically explained and illustrated without departing from its spirit or scope.

What is claimed is:

1. A vehicle wheel comprising:
   a wheel disk including an annular flange which is concentric about an axis of rotation and extends axially from an inboard face of said wheel disk;
   a generally cylindrical partial wheel rim concentric about said axis of rotation and having an annular outboard end portion; and
   a balancing flange extending generally radially inwardly from said outboard end portion of said partial wheel rim for receiving one or more balance weights, said balancing flange having an outboard face which is fixed to said annular flange of said wheel disk.

2. The vehicle wheel of claim 1 wherein said balancing flange is disposed in the plane of rotation of the axial center of mass of the wheel about said axis of rotation.

3. The vehicle wheel of claim 1 further including a tire mounted on the wheel to form a wheel and tire assembly, said balancing flange being disposed in the plane of rotation of the axial center of mass of the wheel and tire assembly about said axis of rotation.

4. The vehicle wheel of claim 1 wherein said balancing flange is integrally formed on said wheel rim.

5. The vehicle wheel of claim 1 wherein a circumferentially continuous weld joins said balancing flange to said annular flange on said wheel disk.

6. The vehicle wheel of claim 1 wherein said wheel rim further includes a wheel well portion, said balancing flange being formed on the radially inner surface of said wheel well portion.

7. A vehicle wheel and tire assembly comprising:

a generally cylindrical wheel rim, said wheel rim defining an axis of rotation of the wheel;

a tire supported on said rim;

a wheel disk fixed to said wheel rim, and including means for mounting said wheel disk on the vehicle; and a balancing flange extending generally radially inwardly from said wheel rim, said balancing flange being disposed in the plane of rotation of the axial center of mass of the wheel and tire assembly and adapted to receive one or more balance weights for balancing the wheel and tire assembly.

8. The vehicle wheel and tire assembly of claim 7 wherein said balancing flange is integrally formed with said wheel rim.

9. The vehicle wheel and tire assembly of claim 7 wherein said wheel rim includes a partial wheel rim welded to a full face wheel disk, and said balancing flange is formed on an annular outboard end portion of said partial wheel rim.

10. A method of producing a vehicle wheel comprising the steps of:

(a) providing a generally circular wheel disk having an annular flange extending from an inboard face thereof;

(b) providing a generally cylindrical partial wheel rim having an annular outboard end portion;

(c) forming, on one of said annular flange and said outboard end portion of said partial wheel rim, a radially inwardly extending balancing flange for mounting one or more balance weights;

(d) positioning said balancing flange formed on said one of said annular flange and said outboard end portion of said partial wheel rim against an axial end of the other of said annular flange and said outboard end portion of said partial wheel rim with said wheel disk and said partial wheel rim coaxially aligned; and (e) securing said wheel disk and said partial wheel rim together to produce the vehicle wheel.

11. The method of claim 10 wherein step (c) includes rolling said balancing flange so as to extend radially inwardly from one of said annular flange and said outboard end portion of said partial wheel rim.

12. The method of claim 11 wherein said balancing flange is formed on said outboard end portion of said partial wheel rim.

13. The method of claim 10 wherein step (e) includes forming a circumferentially continuous weld between said annular flange and said balancing flange.

14. The method of claim 10 wherein the wheel disk provided in step (a) is a full face wheel disk.

15. The method of claim 10 wherein step (c) includes forming said balancing flange in an expected plane of rotation of the axial center of mass of the wheel.

16. The method of claim 10 further including a preliminary step before step (a) of selecting a tire to be mounted on the wheel and wherein step (c) includes forming said balancing flange in an expected plane of rotation of the axial center of the combined mass of the wheel and said tire.

17. The method of claim 10 wherein said step (c) includes welding a separately formed ring to a radially inner surface of one of said annular flange and said partial wheel rim to form said balancing flange.

18. The method of claim 10 further including a method of mounting a tire on said wheel comprising the additional steps following step (e) of:

(f) mounting a tire on said wheel;

(g) checking the balance of the assembly of said tire on said wheel; and (h) affixing a balance weight to said balancing flange to bring the assembly of said tire on said wheel into static balance.

19. The method of claim 18 wherein said wheel rim includes an inboard tire bead retaining flange, and further including the additional step following step (h) of:

(i) attaching a balance weight to said inboard tire bead retaining flange to bring the assembly of said tire on said wheel into dynamic balance.

20. The vehicle wheel and tire assembly of claim 7 wherein said wheel includes an inboard tire bead retaining flange and further including balance weights attached to said balancing flange and said inboard tire bead retaining flange such that said vehicle wheel and tire assembly is dynamically balanced.

\* \* \* \* \*